United States Patent [19]
Yasunaka et al.

[11] Patent Number: 6,080,260
[45] Date of Patent: Jun. 27, 2000

[54] METHOD AND EQUIPMENT FOR PRODUCTION OF LAMINATED METAL SHEET

[75] Inventors: Kenji Yasunaka; Keisuke Takesue; Kenichi Miyata, all of Yamaguchi, Japan

[73] Assignee: Toyo Kohan Co., Ltd., Tokyo, Japan

[21] Appl. No.: 09/066,448

[22] PCT Filed: Nov. 1, 1996

[86] PCT No.: PCT/JP96/03218

§ 371 Date: Apr. 30, 1998

§ 102(e) Date: Apr. 30, 1998

[87] PCT Pub. No.: WO97/16310

PCT Pub. Date: May 9, 1997

[30] Foreign Application Priority Data

Nov. 2, 1995 [JP] Japan ................................ 7-309859

[51] Int. Cl.⁷ .................................................. B32B 31/00
[52] U.S. Cl. .................. 156/229; 156/309.9; 156/322; 156/324; 156/494; 156/499; 156/555
[58] Field of Search ............................... 156/229, 308.2, 156/309.6, 309.9, 322, 324, 494, 495, 499, 555, 583.1

[56] References Cited

U.S. PATENT DOCUMENTS

| | | |
|---|---|---|
| 4,614,691 | 9/1986 | Inui et al. .............................. 428/623 |
| 5,044,074 | 9/1991 | Hadwiger et al. ........................ 29/848 |
| 5,071,504 | 12/1991 | Singer ...................................... 156/301 |
| 5,330,605 | 7/1994 | Tanaka et al. ....................... 156/309.9 |
| 5,407,702 | 4/1995 | Smith et al. ............................ 427/211 |
| 5,571,368 | 11/1996 | Barge ...................................... 156/359 |
| 5,679,200 | 10/1997 | Newcomb et al. .................. 156/308.2 |
| 5,705,022 | 1/1998 | Lewis et al. .......................... 156/379.8 |
| 5,919,517 | 7/1999 | Levendusky et al. .................. 427/211 |

FOREIGN PATENT DOCUMENTS

| | | |
|---|---|---|
| 50-077461 | 6/1975 | Japan . |
| 51-042787 | 4/1976 | Japan . |
| 60-248351 | 12/1985 | Japan . |

*Primary Examiner*—James Sells
*Attorney, Agent, or Firm*—Browdy and Neimark

[57] ABSTRACT

When producing a laminated metal sheet, the air bubbles taken in when laminating can be lessened so that a laminated metal sheet with low rate of air bubbles can be obtained. For this purpose, in a production method of a laminated metal sheet comprising the steps of laminating of plastic film 2 on at least one side of a metal sheet strip 1, the plastic film is heated to a temperature of between the glass transition temperature of the plastic film and a temperature at which the thermal shrinkage of the film attains 3% when the plastic film is kept for 30 minutes at a constant temperature, and just after the heating, the plastic film is brought into pressure contact with the metal sheet, by which laminated metal sheet in which air bubbles are hard to be taken in when laminating, and the rate of air bubbles is low can be obtained.

24 Claims, 2 Drawing Sheets

METHOD AND EQUIPMENT FOR PRODUCTION OF LAMINATED METAL SHEET

TECHNICAL FIELD

The present invention relates to a method and equipment for production of laminated metal sheet, and in particular to a method for producing laminated metal sheet used for can containers at a high speed and an equipment for production for carrying out the method.

BACKGROUND ART

Recently, laminated metal sheet, in which plastic films such as polyester films are laminated on one side or both sides of a thin metal sheet (in particular, a cold rolled steel sheet with the thickness of from 0.13 to 0.38 mm), instead of a tin-plated steel sheet is being used as material for can container. In such a laminated metal sheet, for laminating a plastic film to a metal sheet, there are the method for heat-bonding by applying the self-adhesiveness of the film, and the method for bonding a plastic film with a metal sheet through a bonding agent. In both cases, a metal sheet is heated, cold plastic films are put on the heated metal sheet, and then the metal sheets are pressed together using a pair of laminating rolls. For example, when laminating plastic films on both sides of a metal sheet, the metal sheet is heated to a temperature higher than the softening point of the films through such apparatus as an electric heating apparatus, a high-frequency heating apparatus, a hot blast stove and others, a cold plastic film is put on both sides of the heated metal sheet, and then the cold plastic film and the heated metal sheet are passed through between a pair of laminating rolls having a rubber lining so that the plastic film is bonded to the metal sheet (refer to Japanese Patent Laid Open No. 8335/1994(Heisei 6)).

In the conventional method for production of a laminated metal sheet in which a metal sheet is heated in laminating, there is no problem when laminating is carried out at a low speed of the order of 20 m/min. However, when laminating at a high speed beyond 150 m/min, the percentage of mixed air bubbles (the ratio of air bubbles) caught between the metal sheet and plastic film of the laminated metal sheet obtained reaches 10 to 30% by the area ratio. When the laminated metal sheet in which air bubbles are mixed is deep-drawn to be formed into can containers, flaws are apt to be caused at such portions on the surface of the laminated metal sheet, which causes the deterioration of products. Further, when the lamination is carried out at a high speed beyond 200 m/min, there are cases in which the adhesion strength becomes uneven, which causes the lowering of the strength of adhesion.

It is a technical solution of the present invention to provide a production method of a laminated metal sheet in which the taking-in of air bubbles is low and the unevenness of adhesion is low even when lamination is carried out at a high speed, and to provide an equipment for the production of a laminated metal sheet used for it, cancelling the above-mentioned problems of the conventional methods.

DISCLOSURE OF INVENTION

The production method of a laminated metal sheet of the present invention is characterized in that in a production method of a laminated metal sheet comprising the step of laminating of a plastic film on at least one side of a metal strip, heating the plastic film to a temperature which enables to heat-bond the plastic film with the metal sheet, and the plastic film is brought into pressure contact with the metal sheet just after the heating. In this production method, it is desirable that the plastic film is heated to a temperature between the glass transition temperature of the plastic film and a temperature at which the thermal shrinkage of the film attains 3% when the film is kept for 30 minutes at a constant temperature. Further, it is desirable that the lamination is practiced while giving tension of from 2 to 14 N/mm$^2$ to the film.

The equipment for the production of a laminated metal sheet of the present invention is characterized in that in an equipment for the production of a laminated metal sheet comprising a pair of laminating rolls, a metal sheet feeding means for continuously feeding a metal strip to the laminating rolls and a film feeding means for feeding plastic films to be laminated on at least one side of the metal sheet, the equipment further comprises a film heating means for heating the plastic film to a fixed temperature just before laminating. It is desirable that the above-mentioned film heating means is the one which can heat the plastic film to a temperature of between the glass transition temperature of the plastic film and a temperature at which the thermal shrinkage of the film attains 3% when the film is kept for 30 minutes at a constant temperature, and further, it is desirable that it further comprises a means for applying tension of from 2 to 14 N/mm$^2$ to the plastic film.

BEST MODE FOR CARRYING OUT THE INVENTION

Figure 1:
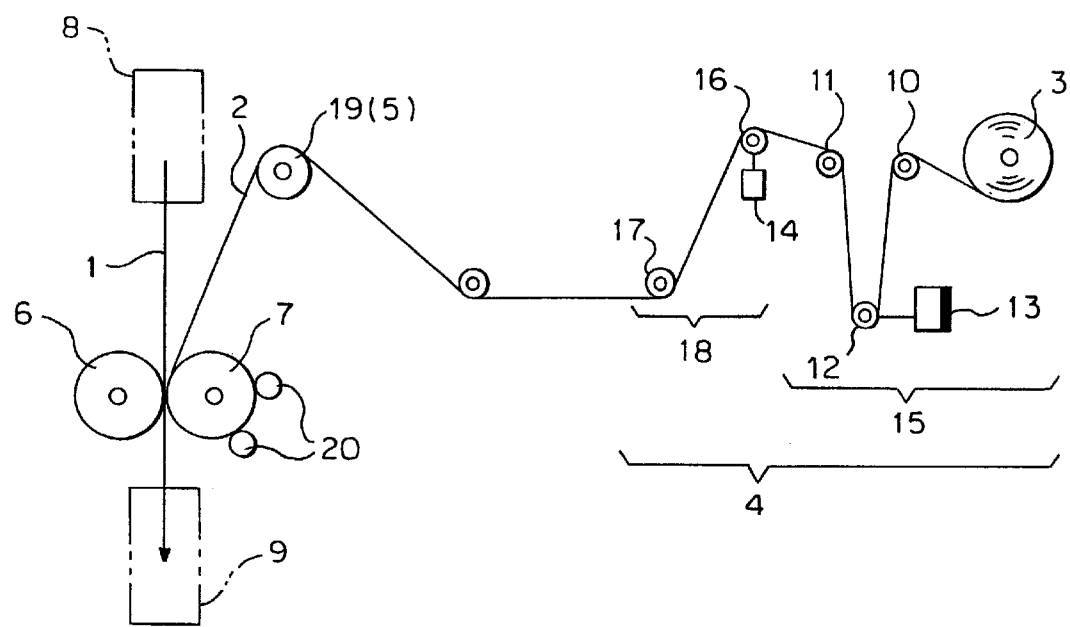
FIG. 1 is a schematic side view showing one example of a practical mode of the equipment for the production of the present invention.

In a conventional method, since a plastic film is cold until it is brought into contact with a metal sheet, the plastic film is hard to adhere to the metal sheet, due to the stiffness of the film itself, and so the plastic film is forced to be brought into contact with the metal sheet by means of laminating rolls. Therefore, it is considered that when the lamination is carried out at a high speed, air bubbles become apt to be taken in (caught in) between the film and the metal sheet. However, in the production method of the present invention, a plastic film, heated to a temperature at which the film can heat-bond to the metal sheet, is softened before it comes into contact with the metal sheet. Therefore, it is considered that the plastic film sufficiently adheres to the metal sheet, and air bubbles are hard to be trapped (air bubbles are hard to be formed between the metal sheet and the plastic film). And when the plastic film is brought into pressure contact with the metal sheet right after the heating of the plastic film and before the temperature of same falls, the plastic film is adhered onto the metal sheet without unevenness by the self adherability of the plastic film, wherein by heating also the metal sheet,the adhesion of the plastic film to the metal sheet can be improved.

Further, in a conventional method, when a plastic film is brought into pressure contact with a metal sheet through a pair of laminating rolls, heat is transmitted from the pre-heated metal sheet to the plastic film through the heat transmission action by which the plastic film is melted or softened, and after the plastic film is separated from the laminating roll, it is cooled at a normal temperature. Accordingly, there is no problem when the supply speed of the metal sheet and the plastic film is low. However, when the supply speed increases, the temperature of the film is hard to raise, and an unevenness of temperature is caused in the plastic film, which causes the unevenness of adhesive strength. However, in the production method of the present invention, since the plastic film is preheated to a fixed temperature, the distribution of the temperature in the thickness direction in the plastic film is uniform, and the lamination is efficiently carried out even in high speed operation.

In the production method of the present invention, in case where a plastic film is heated to a temperature of between the glass transition temperature of the plastic film and a temperature at which the thermal shrinkage of the film attains 3% when the film is kept for 30 minutes at a constant temperature, air bubbles are caught in between the plastic film and the metal sheet even when lamination is carried out at a high speed, and so the adhesion of the film to the metal sheet is improved. Further, in case where lamination is carried out while giving tension of from 2 to 14 $N/mm^2$ to the film, air bubbles being caught in between the plastic film and the metal sheet is efficiently prevented.

EXAMPLE

Figure 2:
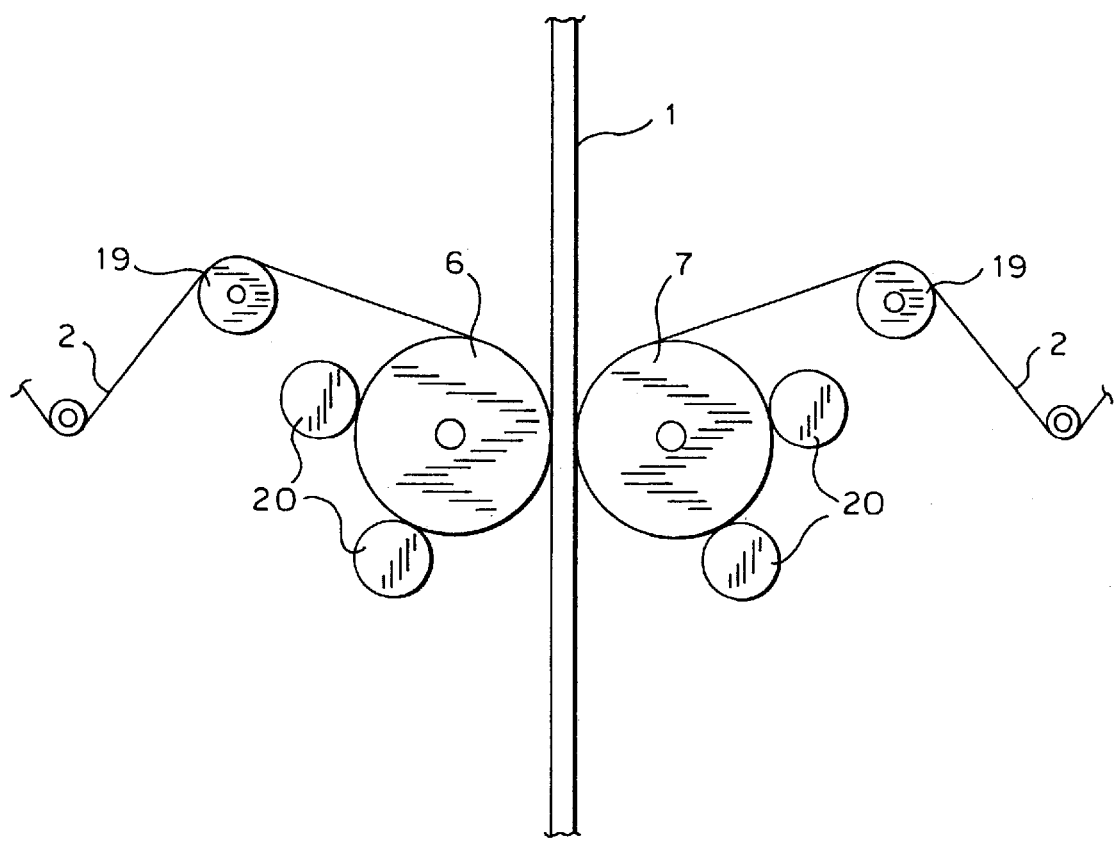
FIG. 2 is a side view of an essential part showing another practical mode of the equipment for production of the present invention.

Next, referring to the drawings, desirable mode of the production method and equipment of the present invention is explained. FIG. 1 is a schematic side view showing one example of a practical mode of an equipment according to the present invention. FIG. 2 is a side view of an essential part showing another practical mode of an equipment according to the present invention.

FIG. 1 shows one example of equipment for laminating a plastic film (hereinafter referred to as "film") 2 on one side of a metal sheet 1. In FIG. 1, numeral 3 designates a roll of film 2, numeral 4 designates a tension controlling means for controlling tension of film 2 being sent out, and numeral 5 designates a means for heating plastic film 2 to a fixed temperature. Further, numerals 6 and 7 designate laminating rolls for pressing film 2 to metal sheet 1, and numerals 8 and 9 designate suppliers of metal sheet 1 and an obtained laminated sheet, respectively.

The above-mentioned tension controlling means 4 comprises a pair of stationary guide rolls 10 and 11, in between which a movable guide roll 12 is arranged; a tension controlling device 15, provided with a force detector load cell 13 at the movable guide rolls 12; and a tension controlling device 18, provided with a movable guide roll 16, which is provided with a tension detector load cell 4, placed between the above-mentioned guide roll 11 and another stationary guide roll 17. The tension controlling means 4 serves to giving suitable tension to the film 2 when running, so as to keep the smoothness of the film.

The above-mentioned heating means 5 is composed of a heating roll which is heated by means of steam, electric heating or some other heating means. It is arranged at the process immediately before laminating rolls 6 and 7. The temperature of heating roll 19 varies depending on materials of the film. However, it is desirable to set the temperature of the heating roll 19 between the glass transition temperature Tg of synthetic resin forming its film and allowable film shrinking temperature Tx. The allowable film shrinking temperature Tx is the temperature corresponding to thermal shrinkage of 3% which is obtained when the film has been kept at its temperature for 30 minutes. When the temperature is lower than the glass transition temperature Tg, the film is hard to be kept smooth, while when the temperature is higher than the allowable film shrinking temperature Tx, the shrinkage of the film increases so that it is difficult to maintain the size of the film. Further, as the film excessively stretches to slacken, wrinkles are apt be caused when the film is brought into pressure contact with the metal sheet.

The heating roll may be singular. However, it is desirable to use a plurality of them to securely heat the film to a fixed temperature even in high speed operation. A heating roll heated by steam (heat medium) and others can be applied as heating means, or heating of the film can be made by passing the film through an electric heating device, high-frequency-heating device, hot blast stove and others.

Further, laminating rolls 6 and 7 are steel rolls having a diameter of the order of 460 mm to 670 mm, provided with a rubber-lining having thickness of the order of 20 to 40 mm on the surface of it and has a larger diameter than that of conventional laminating rolls. In case where the laminating rolls having such a large diameter are used, enough nipping time can be taken so that secure laminating can be made even if the laminating speed is increased. One to four cooling rolls 20 are arranged around laminating rolls 6 and 7 so that the temperature of laminating rolls 6 and 7 can be cooled to be kept within a fixed temperature range. Conventional suppliers can be applied for supplier 8 of metal sheets and supplier 9 of laminated sheets.

In the equipment composed as above-mentioned, while the course of film 2 unwound from roll 3 is changed by stationary guide roll 10, movable guide roll 12 and stationary guide roll 11, the upward load is measured by the load cell 13 provided at the movable guide roll 12. Further, while the course of the film is changed by movable guide roll 16 and stationary guide roll 17, the film tension is measured by load cell 14 provided at movable guide roll 16. Movable guide roll 12 is moved (for example traversed up and down) based on the measured tension so that the film tension can constantly be controlled within a fixed range.

Then, film 2 is brought into contact with heating roll 19, heated to a fixed temperature, and is hot-bonded on metal sheet 1 by means of laminating rolls 6 and 7. In this case, since film 2 is heated to the temperature beyond the glass transition temperature Tg and below the allowable film shrinking temperature Tx, the film can securely be hot-bonded to the metal sheet, and besides thermal shrinkage of the film is low. Further, as laminating is practiced while tension is being applied to the film, the surface of the laminated sheet can be kept smooth.

Any kind of metal sheet used in the conventional laminate sheet, such as TFS, aluminum sheet and others having thickness of 0.13 to 0.38 mm can be applied for metal sheet 1 used in the above-mentioned production method. Further, any of films used in the conventional laminate sheet, such as polyester film, polyethylene, polypropylene, polyethylene naphthalate and others having thickness of 12 to 25 μm can be applied for film 2.

Next, referring to FIG. 2, another practical mode of the present invention is explained. FIG.2 shows an example in which films 2 are laminated on both sides of metal sheet 1. Laminating rolls 6 and 7 are steel rolls having a rubber lining, respectively, and have relatively large diameter (for example 700 mm to 750 mm), in which the rubber lining is also thick (for example 40 mm). And the increase in temperature of laminating rolls 6 and 7 is controlled by means of cooling rolls 20. As a roll having a larger diameter provides longer nip length, the time needed for nipping can be secured even in high speed operation, which gives secured adhesion of the film to the metal sheet.

Further, as tension of 2 to 14 N/mm$^2$ is applied to the film, the taking-in of air bubbles in between the film and the metal sheet is low. Therefore, the rate of air bubbles taken in the obtained laminate sheet (the rate of air bubbles) is below 10% by the area ratio and thus low. Accordingly, high-quality laminated sheet can be produced even in high speed operation.

Next, showing concrete examples and comparative examples, a production method of the present invention is explained.

Examples 1 to 10

An equipment, in which the arrangements shown in FIG. 2 are substituted for those in the portion surrounding laminating rolls 6 and 7 in the equipment shown in FIG. 1, is provided, by which a film of PET resin (the glass transition temperature Tg: 74° C., the allowable film shrinking temperature Tx: 130° C.) having 980 mm width and 25 mm thickness is laminated on a preheated Cr-plated steel sheet having 960 mm width and 0.26 mm thickness, at a laminating speed of 200 m/min. And the fluctuation in the rate of air bubbles (the ratio of area) is investigated in case where the heating temperature of the film and the tension of the film just before lamination are varied.

As a measuring method of the rate of air bubbles, for example in a laminated sheet, the ratio of area S2 of air bubbles against base area S1, namely the rate of air bubbles (S2/S1×100) is shown as a value.

Air bubbles can be observed and measured by means of a metallurgical microscope, for example at around 400 power magnification. The portion of air bubbles and other portions can be clearly distinguished, when observing the laminated sheet in which air bubbles are formed using a metallurgical microscope. Portions which look like bubbles observed with a metallurgical microscope correspond to air bubbles. After taking a photograph of the whole visual field of the microscope, outlines of the bubbly portions in the finished photograph are traced, and the inside of traced outlines is smeared (for example the inside is smeared with black), thereby the smeared portions are distinguished from the other portions. Then, the ratio of the smeared portions against other portions is determined using a picture area analyzer and such and is numerically expressed.

It can be deduced by taking a microphotograph, at what rate air bubbles are formed per base area, wherein a circle having a diameter of 2 mm is available for base area S1.

Also, since air bubbles are most apt to be caused near the side edges of strips of the laminated sheet in laminating operation, the average of measured values, measured for example at the center portions and at positions 25 mm distant from the edge portions of the laminated sheet, respectively can be available.

Further, in case of measuring actually during a laminating operation, pictures taken by an image camera is computerized by which the area ratio of portions having air bubbles to portions without any air bubble can automatically be calculated.

The results measured by varying conditions are shown in Table 1.

In Table 1, "—" in the column for film tension means a state where tension is slightly applied to a film in such an extent that the film does not run in waves, and substantially "0". In these examples, the diameter of the laminating rolls was 750 mm, the thickness of the rubber lining was 40 mm, and four cooling rolls were provided on one side of the laminating rolls and set at a temperature 10° C. lower than that of the laminating rolls. Laminating pressure was Max 120,000N, wherein in this case nip length was 105 mm.

Examples 11 to 12

The cases where the film was kept at 70° C., the film tension is substantially "0", and 4.1 N/mm$^2$ are shown as Examples 11, 12 in Table 1, respectively.

TABLE 1

|  | Heating temperature of film (° C.) | Film tention (N/mm$^2$) | Rate of air bubbles (%) |
|---|---|---|---|
| Example 1 | 100 | — | 8 |
| Example 2 | 100 | 3.5 | 7 |
| Example 3 | 130 | — | 7 |
| Example 4 | 130 | 2.5 | 6 |
| Example 5 | 150 | — | 6 |
| Example 6 | 150 | 2.9 | 5 |
| Example 7 | 175 | — | 4 |
| Example 8 | 175 | 2.4 | 3 |
| Example 9 | 200 | — | 3 |
| Example 10 | 200 | 2.1 | 2 |
| Example 11 | 70 | — | 10 |
| Example 12 | 70 | 4.1 | 7 |

COMPARATIVE EXAMPLES

Results of lamination carried out under the same condition as that in examples 1 to 12 except that the film is kept at room temperature are shown in Table 2.

TABLE 2

|  | Film tention (N/mm$^2$) | Rate of air bubbles (%) |
|---|---|---|
| Comp. ex. 1 | — | 40 |
| Comp. ex. 2 | 2.9 | 20 |
| Comp. ex. 3 | 2.1 | 17 |
| Comp. ex. 4 | 4.1 | 12 |

As it is clear from Table 1, in examples 1 to 10 in which the heating temperature of a plastic film is higher than the glass transition temperature, the laminated sheet of high quality having the rate of air bubbles of 2 to 8% can be produced even at a high speed operation. Further, Examples 2, 4, 6, 8 and 10, in which film tension of 2.1 to 3.5 N/mm$^2$ were given to the films, respectively, have the rate of bubbles which is about 1 point lower than those in examples 1, 3, 5, 7 and 9 in which tension is not given to the film. Therefore, it is seen that if other conditions are the same, the rate of air bubbles becomes lower when tension is applied to the film. Further, it is seen that when the heating temperature of the film is higher, the rate of air bubbles become lower.

Further, even in example 11 in which the heating temperature is 70 ° C., which is somewhat lower than the glass transition temperature, and the film tension is not given to the film, the rate of air bubbles thereof is 10% and so it is sufficiently practical. In this case, when tension given to the film is increased (4.1 N/mm$^2$), the rate of air bubbles is 7%, that is about the same as that in examples 2 and 3. However, it is seen that in case of examples 1 to 10, even if tension is not given to the film, or even if tension given to the film is in the relatively controllable range of from 1 to 3.5 N/mm$^2$, these examples are more preferable, since the rate of air bubbles becomes to be below 8% in which case a laminated metal sheet is deep drawn without easily becoming flawed.

On the other hand, in any case of comparative examples 1 to 4 in which the film is not heated, the rate of air bubbles is 12 to 40% in which cases flaws taken on the surface of laminated sheet in deep drawing are increased and so laminated metal sheets of the comparative examples are unsuitable for can stock material.

INDUSTRIAL APPLICABILITY

According to the production method of the present invention, the taking-in of air bubbles is low, and unevenness of adhesion is low even when lamination is practiced at high speed. In case where tension is applied to a heated film, the taking-in of air bubbles can be more lessened. The equipment of the present invention enables to carry out the above-mentioned production method.

What is claimed is:

1. A production method of a laminated metal sheet comprising laminating of a preformed plastic film on at least one side of a metal sheet strip, wherein the preformed plastic film is heated to a temperature which enables to heat-bond the plastic film with the metal sheet, and just after the heating, the preformed plastic film is brought into pressure contact with the metal sheet.

2. A production method as claimed in claim 1 wherein the preformed plastic film is heated to a temperature of between the glass transition temperature of the plastic film and a temperature at which the thermal shrinkage of the film attains 3% when the film is kept for 30 minutes at a constant temperature.

3. A production method as claimed in claim 1 wherein laminating is practiced while further applying tension to the film.

4. A production method as claimed in claim 3 wherein the laminating is practiced while giving tension of from 2 to 14 N/mm$^2$ to the plastic film.

5. A production method as claimed in claim 2 wherein laminating is practiced while further applying tension to the preformed film.

6. A production method as claimed in claim 5 wherein the laminating is practiced while giving tension of from 2 to 14 N/mm$^2$ to the plastic film.

7. A production method as claimed in claim 1 wherein the metal sheet strip is heated to a temperature higher than the melting temperature of the plastic film.

8. A production method as claimed in claim 1 comprising feeding the metal sheet strip at a speed of 150 m/min or more.

9. A production method as claimed in claim 1 comprising heating the metal sheet strip to a temperature higher than the melting temperature of the preformed plastic film, and feeding said metal sheet strip at a speed of 150 m/min or more.

10. A production method as claimed in claim 7 wherein said heating of the preformed plastic film is to a temperature between the glass transition temperature of the plastic film and a temperature at which the thermal shrinkage of the film attains 3% when the film is kept for 30 minutes at a constant temperature.

11. A production method as claimed in claim 8 wherein said heating of the preformed plastic film is to a temperature between the glass transition temperature of the plastic film and a temperature at which the thermal shrinkage of the film attains 3% when the film is kept for 30 minutes at a constant temperature.

12. A production method as claimed in claim 9 wherein said heating of the preformed plastic film is to a temperature between the glass transition temperature of the plastic film and a temperature at which the thermal shrinkage of the film attains 3% when the film is kept for 30 minutes at a constant temperature.

13. A production method as claimed in claim 7 further comprising applying tension to the preformed film during lamination.

14. A production method as claimed in claim 8 further comprising applying tension to the preformed film during lamination.

15. A production method as claimed in claim 9 further comprising applying tension to the preformed film during lamination.

16. A production method as claimed in claim 13 wherein said tension is from 2 to 14 N/mm$^2$.

17. A production method as claimed in claim 14 wherein said tension is from 2 to 14 N/mm$^2$.

18. A production method as claimed in claim 15 wherein said tension is from 2 to 14 N/mm$^2$.

19. A production equipment for a laminated metal sheet comprising a pair of laminating rolls, a metal sheet supplying device for continuously supplying a metal sheet strip, a heater for said metal sheet strip, a film supplier for supplying a preformed plastic film to be laminated on one side of the metal sheet, and a film heater for heating the preformed plastic film just upstream of said laminating rolls.

20. A production equipment for a laminated metal sheet as claimed in claim 19 wherein the equipment further comprises a device for applying tension to the plastic film upstream of said film heater.

21. A production equipment as claimed in claim 20 wherein said device for applying tension to the plastic film serves as giving tension of from 2 to 14 N/mm$^2$.

22. A production equipment as claimed in claim 19 wherein the metal sheet supplying device comprises means for supplying the metal sheet strip at a speed of 150 m/min or more.

23. A production equipment for laminated metal sheet as claimed in claim 22 wherein the equipment further comprises a device for applying tension to the plastic film.

24. A production equipment as claimed in claim 23 wherein said device for applying tension to the plastic film serves as giving tension of from 2 to 14 N/mm$^2$.

* * * * *